Patented Aug. 30, 1927.

1,640,485

UNITED STATES PATENT OFFICE.

FRANK W. DAVIS, OF MILFORD, DELAWARE, ASSIGNOR TO SAMUEL G. ALLEN, TRUSTEE.

BLAST-FURNACE METHOD.

No Drawing. Application filed October 4, 1924. Serial No. 741,604.

This invention relates to smelting by the blast furnace by the use of an oxygen or an oxygenated blast, and its nature, objects and advantages will be clear from the following.

The functions of the smelting zone of a blast furnace are to melt the slag and iron and reduce some silicon, manganese and phosphorus, and in certain cases, a small amount of iron.

It is the function of the shaft of the furnace to prepare the descending material for the smelting zone. It is here that the stock is preheated, the limestone calcined and the greater portion of the iron oxide reduced to metallic sponge.

If we increase the smelting heat to a limited degree by the use of a blast enriched with oxygen or oxygenated air, with or without preheating, we will increase the capacity and efficiency of the furnace as a whole.

In the ordinary smelting of iron ore in the blast furnace with atmospheric air, there has been worked out by practice a certain ratio of ore to coke which it is necessary to charge in the top of the furnace. If the proportion of oxygen in the blast be increased—which would have the effect of decreasing the amount of nitrogen in the blast—then the temperature resulting from the combustion of the oxygen and the carbon of the coke will be higher in the smelting zone. There is a critical temperature which must be reached to keep the molten iron and slag in the fluid state. Heat above this temperature is available for smelting the iron and the amount of iron which is smelted will depend upon the quantity of heat above this critical temperature. If the same amount of iron were melted with an increase in the heat available above the critical temperature obtained by the use of added oxygen in the blast, then the temperature of the melted iron would be higher by the absorption of the excess heat. In the absence of provision to the contrary this temperature becomes very much higher and injures and destroys the furnace itself, a result which apparently has heretofore been incident to attempts to utilize an oxygenated blast.

In order to bring this excessive temperature down to a safe working value, I propose that more iron shall be smelted when the available heat is increased; consequently, for every pound of carbon burned with oxygen, I contemplate that a certain number of pounds of iron must be smelted for each percentage of oxygen in the blast. In order to have a greater ratio of iron smelted for each pound of carbon burned, I propose to charge a greater proportion of iron ore in the top of the furnace than of coke, as would be charged under operation with atmospheric air. In other words, to control the operating conditions with an oxygenated blast, a definite ratio of ore to coke should be charged in the top of the furnace, higher than with atmospheric air as blast. Then the oxygen in the blast should be increased to such a point as to maintain a temperature in the smelting zone within safe values, that is, not too high as to burn out the furnace, nor too low as to freeze the molten iron.

Mere increase in the rate of feed of the burden (in contradistinction to increase in the proportion of ore to coke) will not keep the temperatures down to a safe point because the heat produced is proportional to the amount of coke fed in with the burden, while the heat used in melting the iron is proportional to the amount of ore fed, so that when the ratio of ore to coke is maintained constant the ratio of heat produced to the material for absorbing the heat remains constant, resulting in producing the same operating temperature. It is only by increasing the amount of material absorbing the heat, in comparison with the amount of material that is producing the heat, that the temperature can be reduced, that is, reduced temperatures are obtained by increasing the ratio of ore to coke. The rate at which the furnace operates will not depend upon the ratio of ore to coke and it cannot be speeded up by trying to feed more material at the top, but the rate of operation is really directly proportional to the rate at which oxygen is fed in at the bottom of the furnace, so that the capacity of the furnace is directly proportional to the rate of feed of oxygen.

Now, assuming that, in accordance with my invention, the proper operating temperatures are maintained in the smelting zone by the proper ratio of oxygen to nitrogen in the blast, as compared to the ratio of ore to coke in the burden, the amount of heat available in the shaft secti n to the amount of iron to be reduced will become less as the ratio of ore to coke is increased, or the ratio of oxygen to nitrogen is increased. In the blast furnace, as at present constructed, the shaft is able to prepare an additional amount of material if the work of the smelting zone is speeded up. Hence I can avail myself of this by adding a limited amount of oxygen to the blast, insufficient to detrimentally lower the temperature in the shaft.

The decrease in heat available in the shaft section for the ore to be reduced when oxygen is added is, however, rather rapid, so that a point may be reached where there is insufficient heat for the operations involved in the reduction of the ore, for the following reasons:

In practical blast furnace operation with atmospheric air, it has been found that the volumetric ratio of CO to $CO^2$ in the top gas on leaving the furnace is rarely below 2 to 1. That is to say that for every cubic foot of $CO^2$ or waste gas two cubic feet of CO or reducing gas leaves the furnace. In the past it has been considered that for successful operation this high ratio of CO to $CO^2$ was necessary, and that the lowest possible limit of the $CO/CO^2$ ratio under the most ideal laboratory conditions was 1 to 1 by volume. It would appear, however, that at moderately low temperatures iron oxide is not in equilibrium with a mixture of one volume of CO and one volume of $CO^2$, but that the iron oxide is reduced and the CO content of the gas is decreased. Consequently, with the operation of the blast furnace with increased oxygen the deficiency of the heat in the shaft section, while resulting in reduction of temperature, may not prevent the reducing action taking place; in other words, the top gases may contain a large proportion of $CO^2$ and escape at a comparatively low temperature and will if the ore completely reduces in the shaft section.

If the shaft temperature becomes too low for proper reduction and preheating of the charge, then it will be necessary to add heat from an external source in the shaft section in order to bring the temperature to such a point that reduction will actually occur. And if the burden of ore is so great in respect to carbon charged as to reduce the reducing value of the gas below its actual limit, it will also be necessary to supplement the reducing action in the shaft. To this end, I propose to add additional reducing material such as, powdered coal, fuel oil, coke breeze, coke oven gas etc., to shaft at a point above the mantile, this material to carry sufficient sensible heat to bring the heat in the ascending furnace gas to the requirements for preheating the stock. Also, there is the possibility of it being necessary to add some additional reducing agent for this purpose.

Theoretically for a given increase in the oxygen content of the blast the increase in the ore in proportion to the coke will be correspondingly calculated. The process, however, affords an immediate control of furnace temperatures, for if the proper temperatures are not maintained, due to the presence of excessive moisture or other conditions, then the operator can adjust the control valves for supplying oxygen so as to rectify temperature conditions.

In the old practice if excess moisture or other normally uncontrollable conditions affecting the operation were in existence, it was impossible to control the furnace temperatures within a period less than the time that would be consumed for a change in the proportions of the burden to be felt in the smelting zone, say, 12 hours. By the use of the hot blast it has been possible to cause a very slight change in the operating conditions by changing the temperature of the blast going to the furnace, but this control has been very limited and the practice has been to operate with a constant temperature of the blast, rather than using a variable temperature to control the conditions. The addition of oxygen under control enables me to meet any such conditions arising after intitiation of operation almost immediately and to maintain a constant temperature of operation.

The increase of the oxygen content of the blast will effect a saving in the fuel consumed. The rate at which the furnace operates, or the capacity of the furnace, will be directly proportional to the rate at which the oxygen is fed in with the blast, for the following reasons:

The rate of combustion of the carbon in the coke will be directly proportional to the rate at which oxygen is fed into the furnace, in fact, it is more convenient in many cases to consider combustion as the burning of oxygen by the addition of carbon, rather than the burning of carbon by the addition of oxygen. If the oxygen is fed in at the same rate with oxygenated air as with atmospheric air, then the rate of smelting of the iron will be increased, because the ratio of iron ore to coke will have been increased in the burden. If the amount of blast with oxygenated air is the same as with atmospheric air, then the capacity of the furnace will be increased for two reasons:

(a) Because of the greater ratio of the ore to coke and (b) Because the rate of feed of oxygen will be increased and, consequently, the rate of combustion will be increased.

The standard ratio of coke to iron produced ranges from 1800 to 2200 lbs. of coke per ton pig, depending on practice both as to ore used and grade of iron produced.

I claim:

1. In the smelting of iron in the blast furnace, the increase of the high temperature heat in the smelting zone by the introduction of an additional supporter of combustion with the blast, and the introduction of a reducing material to the shaft at the lower end thereof.

2. In the smelting of iron in the blast furnace, the step of utilizing more oxygen in the blast than in the atmosphere and in controlling temperatures by regulation of the ratio of ore to coke in the burden.

3. In the smelting of iron in the blast furnace, the step of utilizing more oxygen in the blast than in the atmosphere and in correspondingly increasing the ratio of ore to coke in the burden.

4. In the smelting of iron in the blast furnace, the step of utilizing more oxygen in the blast than in the atmosphere and in correspondingly increasing the ratio of ore to coke in the burden and in adding heat to the shaft.

5. In the smelting of iron in the blast furnace, the step of increasing the rate of carbon consumption without materially increasing the operating temperature in the smelting zone, which consists in employing a blast richer in oxygen than air.

6. In the smelting of iron in the blast furnace, the step of increasing the rate of carbon consumption without materially increasing the operating temperature in the smelting zone, which consists in employing a blast richer in oxygen than air, and correspondingly increasing the ratio of ore to coke in the burden and in adding reducing material to the shaft.

7. In the smelting of iron in the blast furnace with a definite ratio of ore to coke in the burden, the regulation and control of the operating temperatures by varying the constitutents in the blast.

In testimony whereof, I have hereunto signed my name.

FRANK W. DAVIS.